United States Patent [19]

Waters

[11] Patent Number: 4,683,156
[45] Date of Patent: Jul. 28, 1987

[54] FLEXIBLE BLANKET

[76] Inventor: Charles M. Waters, Holly Cottage, Church Lane, Wroxham, Norfork, United Kingdom

[21] Appl. No.: 850,862

[22] Filed: Apr. 11, 1986

[51] Int. Cl.$^4$ ............................ B32B 3/14; E02B 3/12
[52] U.S. Cl. ....................................... 428/52; 405/19; 405/20; 52/3
[58] Field of Search ...................... 428/52; 405/19, 20; 52/3

[56] References Cited

U.S. PATENT DOCUMENTS 4,152,875  5/1979  Soland ............................. 405/19 X
4,184,788  1/1980  Colle .................................... 405/19
4,405,257  9/1983  Nielson ................................ 405/19

OTHER PUBLICATIONS

Webster's New World Dictionary, 2nd Edition, 1972, p. 1104, "The Definition of Polygon".

Primary Examiner—Alexander S. Thomas
Attorney, Agent, or Firm—Neal J. Mosely

[57] ABSTRACT

A flexible blanket for protection or stabilization of underwater structures and pipe lines, unstable beds and embankments, comprising a plurality of segments (1) arranged in one or more layers (10) each one segment in height, the segments of the or each layer (10) being disposed substantially contiguously at least at a median zone (2) of their height dimension, each segment (1) tapering substantially regularly from a maximum cross section at said medium zone (2) to a minimum cross section at one or both ends thereof, and each segment being so bonded to each adjacent segment in the region of their respective median zones that the segments are held substantially contiguously but are free to pivot relative one to another about the bond in so far as is permitted by said taper, the arrangement of the tapers being such that each segment is capable of pivoting with more than one degree of freedom.

12 Claims, 20 Drawing Figures

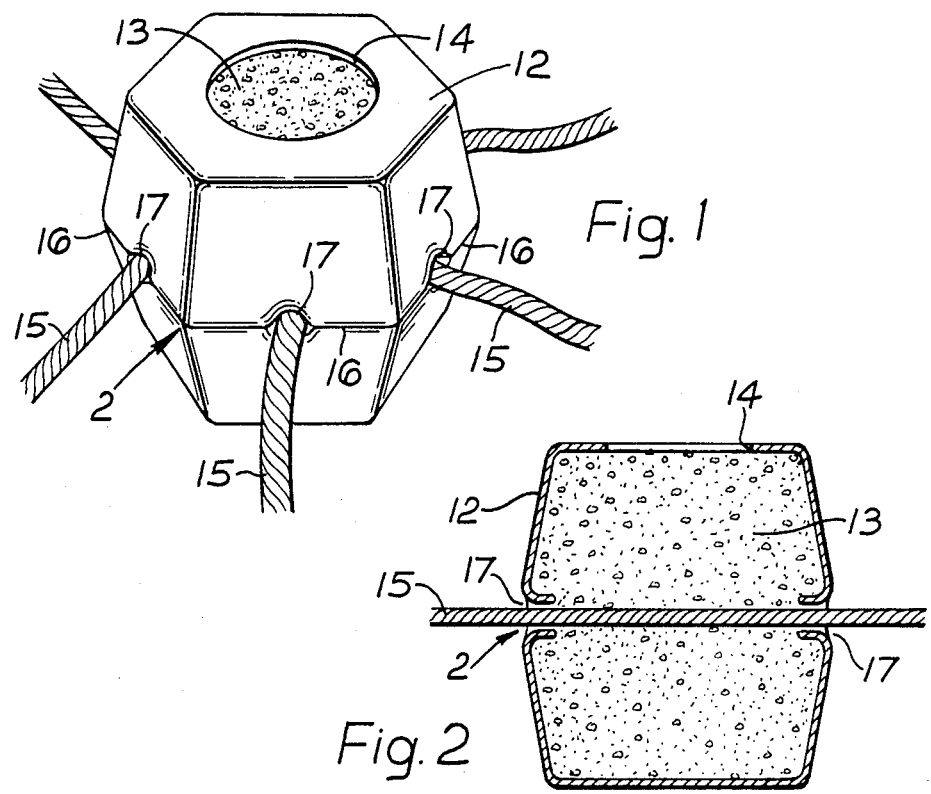
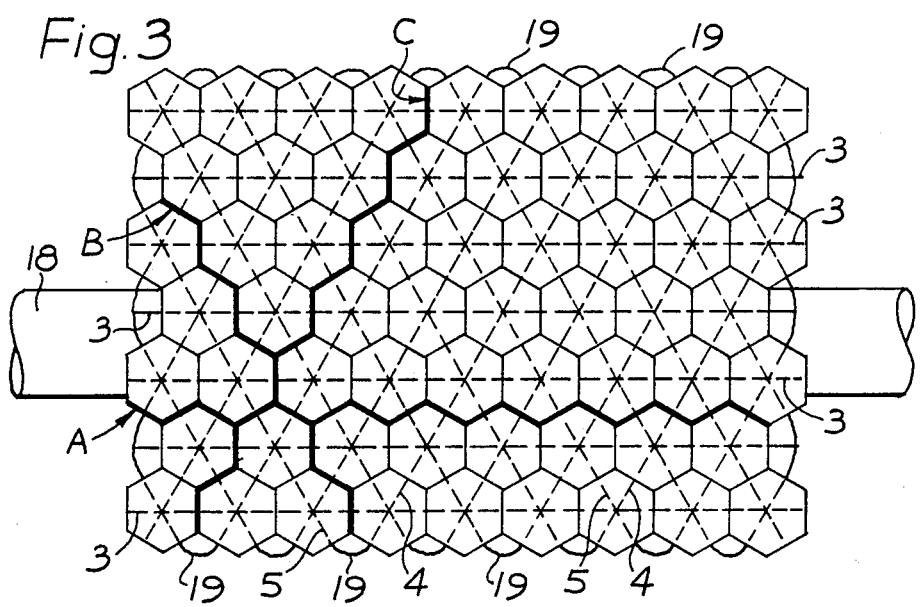

FLEXIBLE BLANKET

FIELD OF THE INVENTION

The present invention relates to flexible blankets, and more particularly to such blankets for protection or stabilisation of underwater structures and pipe lines, sea and river beds, embankments and other situations subject to instability and erosion.

It is common practice to lay pipe lines on the sea bed between for example oil production platforms and on-shore processing facilities. However, as a result of strong currents the sea bed is a very unstable environment. Scouring can remove the sea bed from beneath any object which interupts the flow of the currents and sand waves can erode the entire sea bed over a considerable area. Furthermore the temperature and viscosity of the product conveyed may induce regular movement and oscillation of the pipe line. Many methods of pipe line stabilisation have been employed with varying degrees of limited success.

Damage from trawl boards, anchors, debris and the like is another problem facing pipe lines. Further, anchor chains or construction lines may cut through protective concrete coatings and damage exposed pipes. A stabilisation system therefore which can additionally provide significant mechanical resistance has particular advantages.

It is known to provide pipe lines with a pre-cast reinforced concrete coating. This provides ballast and mechanical protection but renders the pipes more difficult to install and necessitates more sophisticated installation vessels as required coating thicknesses increase. In order to obtain sufficient ballast, the thickness of concrete may need to be quite considerable and in order to remain within practicable limits, supplementary ballast may still be needed. Such coatings do not address the problems of sea bed scour since their external contour, like that of a pipe, maximises turbulence and thereby underscour of the pipe line foundation.

It is also known to entrench pipe lines but this again does not overcome the problem of sand wave erosion which may cause the sea bed elevation to reduce by more than the limit of trenching depth capability.

Another method used in an attempt to overcome the problem of erosion is rock dumping. However, to prevent scavenging of sediment through the rock, a filter bed of graded particles needs to be built up as a preliminary. The particles of rock are not bound one to another and hence movement and sifting occurs in hydrodynamic surge. Erosion at the perimeters is progressive and unavoidable. Positioning of the rock is difficult to control and the potential of damage from the drop is considerable.

Another method tried is the provision of concrete saddles. However, this method, in common with other methods using rigid protection, is only successful when the unit is laid on stable foundations. Such methods are completely unable to withstand or prevent erosion of foundations by sea bed scour.

A more flexible version of the concrete saddle is the provision of concrete grout bags. These are only flexible at a limited number of hinge points and are expensive to install.

Another known method is the provision of filled bitumen mattresses. These are, in theory, flexible by the theory is severely limited by the disadvantageous properties of the bitumen. In warm weather, bitumen is comparatively fluid and the mattresses must be subject to considerable constraint in handling, transportation, storage and installation. However, in cold weather, bitumen becomes so hard that the mattresses are rigid and brittle. Temperatures at the sea bed are low and thus once installed, the mattresses lose their ductility and flex only very slowly. This slow flexing may be sufficient to accommodate gradual changes in the sea bed caused by erosion but is not sufficient to accommodate the degree of flexing caused if it is desired to move the mattress after installation to a new location on the pipe line or if the mattress is disturbed by anchors, trawl boards, etc. Furthermore, bitumen becomes gradually more brittle with age and thus mattresses using bitumen have a limited period of practical benefit.

It is an object of the present invention to provide a flexible blanket which, in addition to its general superiority, overcomes the above disadvantages.

SUMMARY OF THE INVENTION

According to a first aspect of the present invention, there is provided a flexible blanket for protection or stabilisation of underwater structures and pipe lines, unstable beds and embankments, the blanket comprising at least one layer, said layer comprising a plurality of segments, each segment having a top and bottom, and a median zone disposed between said top and bottom, the segment having a cross-section taken substantially perpendicular to the height dimension of the segment, which is a regular polygon, which cross-section has a maximum at said median zone and a minimum at at least one of said top and bottom, the segment tapering substantially regularly from said maximum cross-section to said minimum cross-section; and, bonding means bonding each said segment to a plurality of other adjacent said segments to form a layer one segment in height, such that each segment lies substantially contiguous to all its adjacent segments, at least at said median zone, such that the layer at least at the median zone is substantially continuous, said bonding means bonding each segment to its adjacent segment in the region of their respective median zones, said bonding means being substantially flexible to allow said segments to pivot relative to one another about said bond insofar as the tapers of the segments permit; the arrangement of the tapers being such that each segment may pivot in at least two directions, said directions being mutually non perpendicular.

This produces a blanket which is extremely flexible and can be used to mould about almost any required contour. Moreover, since the segments may pivot in at least two non-perpendicular directions, and therefore the vertical edges of the segments are mutually non-perpendicular, this prevents sawing by anchor cables and construction lines when the blanket is used to protect underwater pipe lines, since there are no straight line joins between rows of segments through which sawing can be facilitated. The blanket includes at least one substantially continuous layer so that if the segments were all lying aligned with each other a substantially continuous plane at the median zone is formed. The segments are as close together, as is practically possible, to form the blanket, i.e, with each edge of each segment being in contact at its median zone to each adjacent segment.

In practice it is impossible for all of the segments to be in total contiguous relationship with each adjacent segment, due to assembly irregularities, and a degree of elasticity in the bonding means. This will not result in sufficient permeability of the blanket to result in filter erosion of the underlying sediment but in sufficient permeability to reduce the suction lift which could otherwise render the blanket unstable in very high and strong wave conditions.

More preferably, each segment is, in plan view, a regular hexagon.

In this case it is preferred that the height of the segment is similar to the width of the segment at its widest cross-section. In this way the segment produced is non-elongate. This minimises the structural stress within the segment.

The blanket produced with hexagonal segments is extremely flexible.

Each segment may comprise a solid block of a mixture of an aggregate, a filler and a binder. The preferred aggregate may be stone, granite, magnetite, maemetite, illmenite or ferrosilicon. The preferred fillers and binders are potash or microsilicate, cement and epoxy resin.

However, it is preferred that each segment comprises a plastics shell filled with an infill of material denser than the shell.

The term "infill" is used to define any material which can be used to fill the plastics shell. It is used to distinguish from the "filler" which now defines a constituent of the mixture making a solid block segment. In the applicant's earlier corresponding foreign applications the material within the plastics shell has been described as a filler, but in this specification the term "infill" has been chosen deliberately. Within these definitions it is possible for the infill to be one of the materials that could make up a solid block, i.e., a constituent of the infill could be a filler.

The plastics shell reduces friction between the segment surfaces and at the bonds between contiguous segments. Clearly the plastics provides surface protection for the infill material, is comfortable to handle and retards marine growth. Moreover the plastics shell is a sympathetic surface to contact adjoining pipe lines, structures or equipment.

Preferably the plastics shell is blow moulded since this is a quick process. The thickness of the shell wall depends on the intended use of the blanket, but typically the thickness may be within the range 1 to 2 mm.

Preferably the shell is a medium or high density polyethylene shell.

The infill is to increase the weight of the finished blanket and the most suitable material for this is concrete since it is quick and cheap to make. The plastics shell retards the set of concrete within it and thus serves to strengthen the concrete.

The segments are typically bonded one to another by rope means extending between adjacent segments.

The rope means preferably forms an interwoven network extending throughout the blanket and embedded in the infill or the material of each segment.

The rope means are preferably plastics material, advantageously nylon, polypropylene, polyester or polyaramid.

The segments may taper from the median zone to one end only, the other end being parallel-sided; or alternatively they may taper from the median zone toward each end. If the segments are only tapered to one end, the resulting blanket made of similar segments will only be able to flex in one direction from the plane of the blanket. If all the segments taper from the median zone to each end, the resulting blanket may flex in two directions from the plane of the blanket.

In many cases the appropriate form for the blanket is a combination of different shaped and arranged segments so that in some areas the blanket can only flex in one direction, and, in others, in two directions.

The median zone may comprise a single plane but this can cause problems especially where the segment tapers towards both ends. In this case, an edge is formed at the median zone which can mean that the edge of one segment may "ride up" over the edge of an adjacent segment. It is therefore preferred that the median zone is a region lying between two parallel planes so that a "flat" is defined between two tapers.

In this case adjacent segments can be placed with their adjacent flats in contact which allows the segments to be pulled tightly together.

Where the segments are joined by ropes, it is preferred that at the region where the rope enters the segment there is provided a shoulder such that an area of reduced cross-section is defined. This means that particles of debris which commonly fall between the segments will lie within the recess formed instead of being ground between the segments and causing stress.

The segments may taper at an included angle in the region of 20° to 30°.

The blanket is preferably bendable about a radius of greater than 200 mm. For "over-bend", when one blanket bends over a pipe the preferred minimum radius is 200 mm and for "sagbend" when the blanket sags the preferred minimum radius is 400 mm.

The size of the segments depends on the intended use of the blanket but the height may be in the range 100–300 mm with width 150–300 mm.

A blanket may comprise a series of identical segments or may comprise a combination of different sized segments.

The blankets may comprise a variety of layers, some of which need not extend over the entire area of the blanket.

One particularly advantageous embodiment of a one layer blanket is of particular use for laying over a pipeline. In this embodiment the segments are hexagonal, and the central strip of the blanket which, in use, lies over the pipeline comprises segments of large size which are heavy and strong. Attached to each side of the strip are wings made up of segments which are smaller and lighter. The wings are constructed on a rope network of which the diagonal ropes are much weaker than the ropes which, in use, run perpendicular to the length of the blanket which are strong enough and extend so far as to connect the wings to the central strip and form continuous lifting elements for handling and installing the blanket. The wings extend the width of the blanket and reduce the risk of anchor snagging. This is effective if an anchor does catch in one of the wings, the weaker bonds break at the point of stress before the outer wing becomes dislodged.

Fronds of artificial seaweed similar to the type sold by Linear Composites Limited of Harrogate, Yorkshire, England may advantageously be attached to selected segments of the blanket. This would encourage the natural build-up of a stabilised sandbank to produce increased protection and deflection capabilities.

In the most advantageous embodiment of the invention, each segment is of hexagonal cross-section, and is held contiguous to six adjacent segments by rope means bonded within the material of the segment or the infill.

Thus, each segment, in use, has three ropes running through its centre with a 60° angle between each pair of ropes. It is noted that at the centre of each segment, the ropes have to cross over each other and so will have to be kinked in the region of the centre.

Thus, each segment has described within it, three rope paths along which, in use, ropes extend.

It is possible for a rope path to be defined by a hollow plastics tube. When the blanket is to be used, a rope is threaded through the tube for linking to an adjacent segment.

According to a second aspect of the invention there is provided a method of making a flexible blanket for protection or stabilisation of underwater structures and pipe lines, the method comprising the steps of:

providing a plurality of hollow plastics shells, each plastic shell having a top and a bottom and a median zone disposed between said top and bottom, the shell having a cross section taken substantially perpendicular to its height dimension which is a regular polygon, which cross section has a maximum at said median zone and a minimum at at least one of said top and bottom, the shell tapering substantially regularly from said maximum cross-section to said minimum cross section, each shell including a plurality of pre moulded bores in the region of its median zone, and each shell including an entry point to allow filling of the shell;

arranging said shells to have their edges at their median zones substantially contiguous;

providing a plurality of rope path defining means;

threading through said pre-moulded bores in the shells said rope path defining means to rope paths within each shell;

providing a settable infill of a material denser than the material of the plastics shell; and filling said shells with said settable infill.

In the case where the segments are a solid block of material the shells act only as moulds and are therefore subsequently removed for re-use.

However, in the preferred case the shells are kept in place.

The rope path defining means may simply comprise a rope so that once the infill has set, a bonded rope network connects all the segments together to form the completed blanket, ready for use.

Alternatively, however, one or more of the rope path defining means may comprise a hollow plastics tube. When the blanket is to be assembled, a rope is thread through the tube which is fixed in position by the infill.

It is possible to make individual segments on their own, with all the rope path defining means being formed by hollow tubes. In this case, segments will be supplied individually and a blanket of any desired size may be made to order by arranging the segments in a desired pattern with their median zones contiguous and then threading a series of ropes or linkages through the plastics tubes to form the completed blanket ready for use.

However, it is preferred that only one of the rope path defining means in a segment is formed by a plastic tube.

In the case where the segments are hexagonal it is preferred that the segments are arranged with their edges contiguous; two sets of diagonal ropes are thread through the pre-drilled bores in the shells; a series of plastics tubes are thread through the segments, all parallel to one another; and the infill material is then introduced into the shells.

Thus, a blanket is produced in which the segments are all coupled together by the diagonal ropes, but not in all directions. Thus each segment is only directly coupled to four of its adjacent segments.

Such a blanket can be readily coupled to a further such blanket to extend its length or width by placing the blankets with their plastics tubes lying end to end and then threading a linking rope straight through each rope path defined by the plastics tubes.

Moreover, if it is required to reduce the size of the blanket in the direction of the plastic tube rope path defining means the diagonals only may be cut and then the linking ropes threaded through the plastics tubes.

This arrangement allows for easy tailoring of the blanket to a particular user's requirements.

When arranging the segments before adding the infill material, preferably the rope means are pulled tightly so that the segments are all in the closest possible configuration to each adjacent segment.

BRIEF DESCRIPTION OF THE DRAWINGS

Embodiments of the present invention will now be more particularly described by way of example and with reference to the accompanying drawings, in which:

FIG. 1 is a perspective view of a first segment for use in a blanket embodying the invention;

FIG. 2 is a section through the segment of FIG. 1;

FIG. 3 is a schematic plan view of a blanket embodying the invention;

DESCRIPTION OF THE PREFERRED EMBODIMENTS

Figure 4:
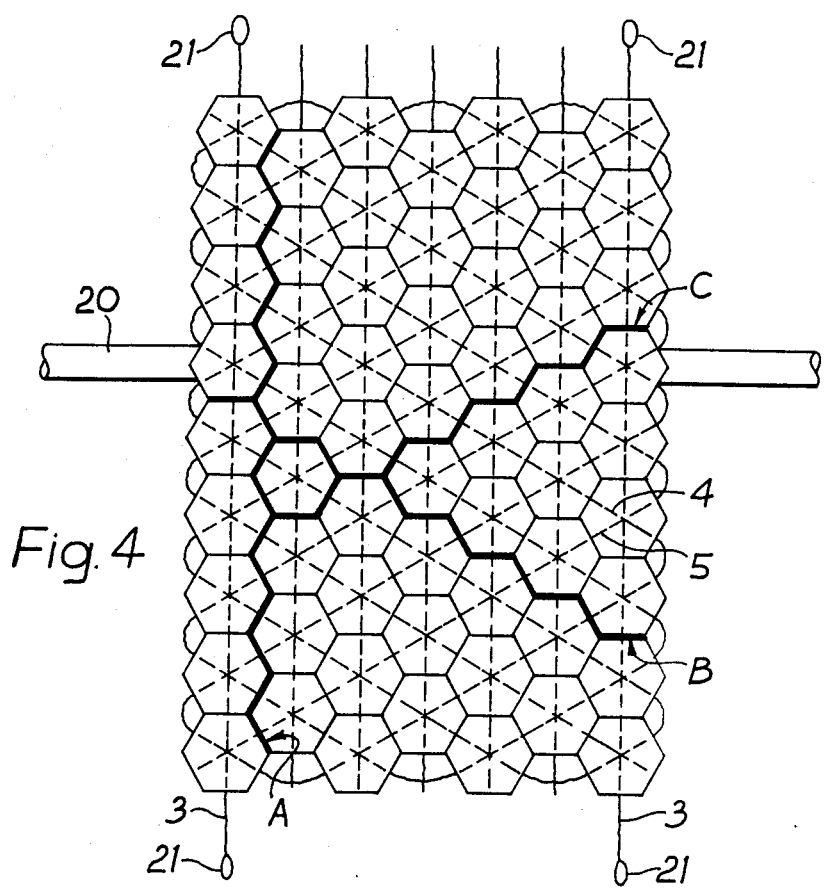
FIG. 4 is a schematic plan view of a second blanket embodying the invention.

In the blankets and segments described, each segment is hexagonal cross-section. This facilitates virtually consistent bending of the blanket in any direction through 360° which gives maximum flexibility of the blanket.

FIGS. 1 and 2 show a first example of a segment for use in a blanket embodying the invention. Each segment has a waist zone 2 where the segment is of maximum cross-sectional area. It is at this point that each segment touches the next adjacent segment in the blanket. The segments shown taper from the waist zone 2 toward each end to a predetermined degree. Such segments can be used to make a blanket which will both sag-bend and over-bend as is required. The taper is regular and the segment has minimum cross-section at each of its ends. The segment could equally be parallel-sided at one end and tapered at an angle between 20° and 30° toward the other end.

This would enable a blanket made of such segments to either sag-bend or over-bend depending on which way the segments are used.

The segment comprises a plastics shell 12 filled with an infill 13. Here the plastics shell 12 is blow moulded polyethylene and the infill 13 is concrete which is clearly denser than the material of the shell and provides the weight of the finished blanket.

The polyethylene shall 12 gives the segment a hard-wearing surface which will not damage pipe lines, whilst the concrete infill 13 gives the high density required.

The shell 12 includes a bore 14 in its upper surface. This is used in making the segments. Once the rope network 15 is in place the concrete 13 is introduced into the shell 12 via the bore 14.

A blanket is made from these segments by providing a plurality of shells 12 arranged with their edges substantially contiguous. Each of the shells 12 has six holes bored in it to accommodate the rope network 15. The ropes 15 are threaded through the holes so that each plastic shell 12 is connected by a part of the rope network to each adjacent plastics shell. The shells 12 are then filled with concrete through holes 14 which sets to hold the ropes 15 in place.

The median zone 2 of the segment is here defined by a single plane and so a series of six edges 16 is defined where the tapers meet.

When forming the blanket it is desirable to have the segments pulled close to one another. There can be a problem that when pulling two segments close together the edge 16 may ride up over the edge of an adjacent segment.

It can be seen that at the point of entry 17 of each rope 15 into the shell there is defined a bell mouth but this shape does not continue along the length of edge 16 as shown in FIG. 1.

The segments are ideally in the range 86 to 170 mm side length at the waist, have a total height between 100 mm and 300 mm, a taper of 20°-30° and are adapted to bend around radii down to approximately 200 mm in overbend, and down to approximately 400 mm in sag-bend.

The segments are formed into blankets as shown in FIGS. 3 and 4. They are arranged with their median zones 2 touching and are held together by a network of ropes. Longitudinal ropes 3 extend parallely through the blanket.

Each of these ropes 3 extends through a line of segments. Each line of segments is connected to the next adjacent line by criss-crossing linking ropes 4 and 5.

The blankets shown in FIGS. 3 and 4 are formed of one layer, one segment in height. The segments are contiguous to each other so that the blanket may form a barrier to prevent, for example, erosion. The ropes 3, 4 and 5 bond each segment to six adjacent segments but the flexibility of the rope allows relative pivoting between adjacent segments to the limit allowed by the tapers. The relative pivoting of each segment is in three non-perpendicular directions with respect to its adjacent segments. The flexibility by pivoting and by mutual twisting is through 360°. This great flexibility allows the blanket to be used in many different areas.

The blankets have a variety of functions. One is to act as a ballast to hold pipe lines or structures in place in which case their prime characteristic is a high density. Alternatively, the blanket may be provided to protect against anchor or construction line sawing in which case hardness is the prime characteristic required. In some circumstances, both density and hardness may be required. Clearly a blanket can be produced which can be used in all situations by correct choice of shell material and infill material.

The thickness of the ropes used depends on the orientation of use of the blanket. As can be seen in FIGS. 3 and 4 the orientation of the blanket with respect to the pipeline to be protected can be in two different modes.

In the first mode the pipeline 18 is of medium to large diameter. The longitudinal ropes 3 are arranged parallel to the pipeline 18. Here the crosslinking ropes 4 and 5 are unbroken throughout the length of the blanket and forms loops 19 at the blanket edge.

The lifting of the blanket is effected via loops 19 and the strength needed results in the overall tensile strength of the blanket being very high. In this mode the flexibility parallel to the direction of the pipeline is controlled by the pivoting between simple angles but perpendicular to the pipeline it is controlled by a compound and therefore larger angle.

This method suits pipeline protection in that the flexibility across the pipeline is greater than the flexibility along the length.

Shown in thicker black line on FIGS. 3 and 4 are shown the lines of reduced mechanical resistance A, B or C across the surface of the blanket. It can be seen that these three lines are parallel to ropes 3, 4 and 5.

In the orientation of FIG. 3 one of these lines A lies generally parallel to the pipeline and so only two lines B and C could relate to possible anchor or construction line abrasion.

If required it is possible to lay adjacent blankets in abutting relationship with the joints mocked by the profile of the castellated ends. In practice this can be difficult to achieve, especially in underwater operations where it can be difficult to achieve accurate control.

In the orientation shown in FIG. 4 the ropes 3 lie perpendicular to the pipeline 20. It will be noticed that here the pipeline 20 is of smaller diameter.

Here the blanket is lifted by parallel ropes 3 only. It is possible to choose thicker and stronger ropes for lines 3 to concentrate the strength into the lift ropes 3 without increasing the overall tensile strength of the blanket which is dependent on the choice of material for ropes 4 and 5.

Thus, typically, the ropes 3 may be 10 mm to 20 mm thick for individual blankets depending on the weight to be borne and up to 48 mm thick for continuous blanket lengths, whilst ropes 4 and 5, the linking ropes, are generally 4 mm to 8 mm diameter three-strand polypropylene and extend diagonally through the blanket.

An advantage of isolating the lift ropes 3 in this way can be utilised in a case where anchor snagging is a major concern. In this event the lifting eye 21 adopted is of minimum size and the diagonal tie ropes 4 and 5 are restricted in strength to produce a stress relief factor whereby, if snagged, the edge of the blanket would lift to a limited degree before tearing, and then diverting the anchor, thereby avoiding total dislodgement of the blanket.

It is possible for steel ropes to be used as ropes 3 whilst retaining fibre ropes for ropes 4 and 5 allowing the blanket to be easily subdivided or shortened in length by cutting the fibre ropes.

When the blanket is used as shown in FIG. 4 there is an advantage when covering cables or lines of small diameter since the zig-zag path which would otherwise run parallel to the line or cable are eliminated and thus, there is no influence on the freedom of the cable to follow its most comfortable line.

Preferred individual blanket sizes are between 2.4 m and 10.0 m wide and between 6 m and 20 m long. This is a convenient size for lifting and transportation. However, for certain applications such as continuous pipe cover the blanket is produced in longer lengths and supplied on reels which can be attached to suitable vessels for installation as shown in FIG. 7.

Figure 5:
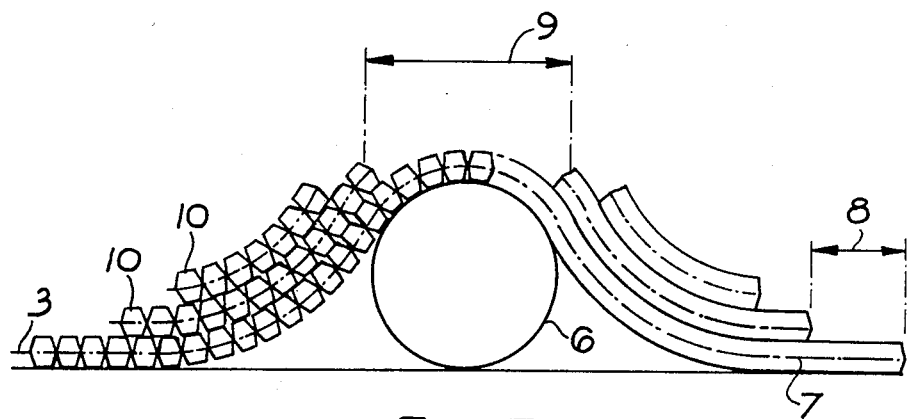
FIG. 5 shows a third multi-layer blanket embodying the invention in use.

FIG. 5 shows one method of using the blanket. Pipe line 6 is ballasted by a mutli-layer blanket in which the layers are held together at the loops 19. the lowermost layer 7 is the primary layer by which the entire assembly can be lifted. The outermost part 8 of this primary layer forms a scour skirt to adapt to changes in condition of the seabed which may be caused by the introduction of the pipe line and its effect on water currents. At the central part 9 of the blanket, there is again only the primary layer since bulk here may tend to facilitate snagging and dislodgement of individual blankets by anchors, trawl boards, etc. Between the outermost part 8 and the central part 9 are a number of secondary layers 10 adapted to provide weight at the points where it will most advantageously hold the pipe line in position.

Figure 6:
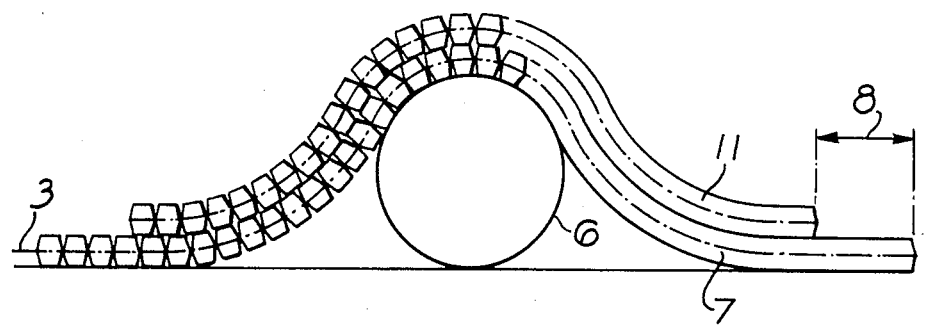
FIG. 6 shows another form of fourth multi-layer blanket in use.

FIG. 6 shows an alternative form in which two layers 7 and 11 are provided each of identical width but the upper layer being of reduced length. A shear membrane (not shown) is provided between the layers to enable relative movement between them and accommodate the over-bend and sag-bend differentials.

Figure 7:
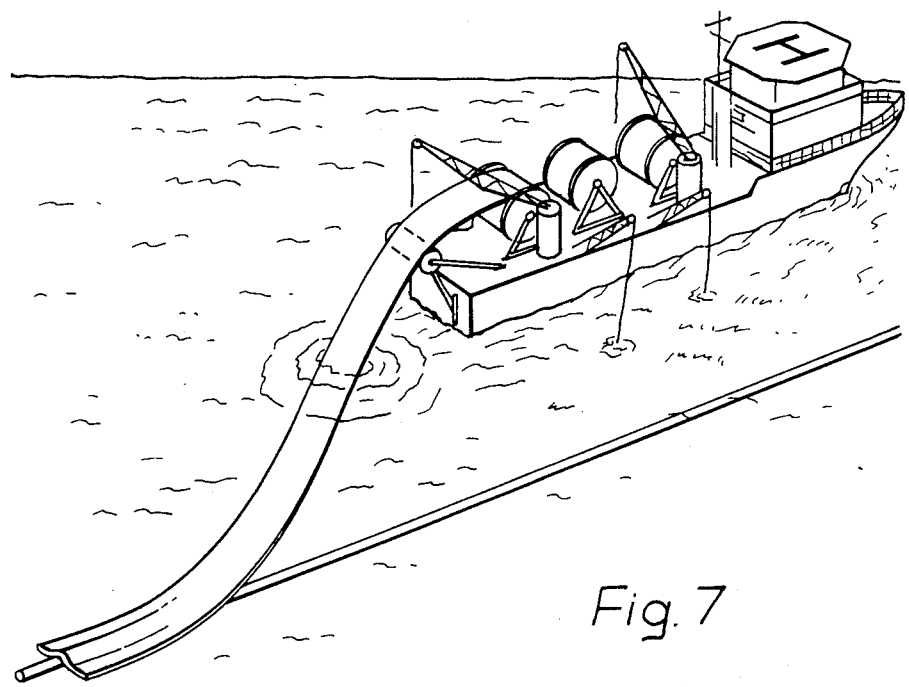
FIG. 7 shows a continuous length of the first blanket in typical installation procedure.

FIG. 7 shows the installation of a continuous length of blanket which would be particularly advantageous where mechanical protection is paramount. In this format snagging contingency and dislodgement is virtually eliminated.

As stated above, the ideal shape for each segment is, in plan view, a regualr hexagon. This enables flexibility in any direction and also helps prevent sawing by anchor cables or construction lines since there are no straight line joins through which the sawing can be facilitated.

The blankets have been more specifically described in relation to stabilisation and protection of underwater structures and pipe lines but other uses, both underwater and on land are intended. For example, the combination of integrated tie ropes at a point where they are protected from damage, and in a manner whereby structural integrity is not impaired by accidental destruction of one or more of the segments or its relative tie ropes, together with the multi-directional ductility of the blanket makes it ideal for paving any unstable surface.

Also the use of varying height segments in alternate horizontal rows on tidal embankments would afford un-surpassed resistance to tidal run-up which, together with the blankets structural integrity, makes it superior to alternative forms of protection for coastal and inland water embankments.

Figure 8:
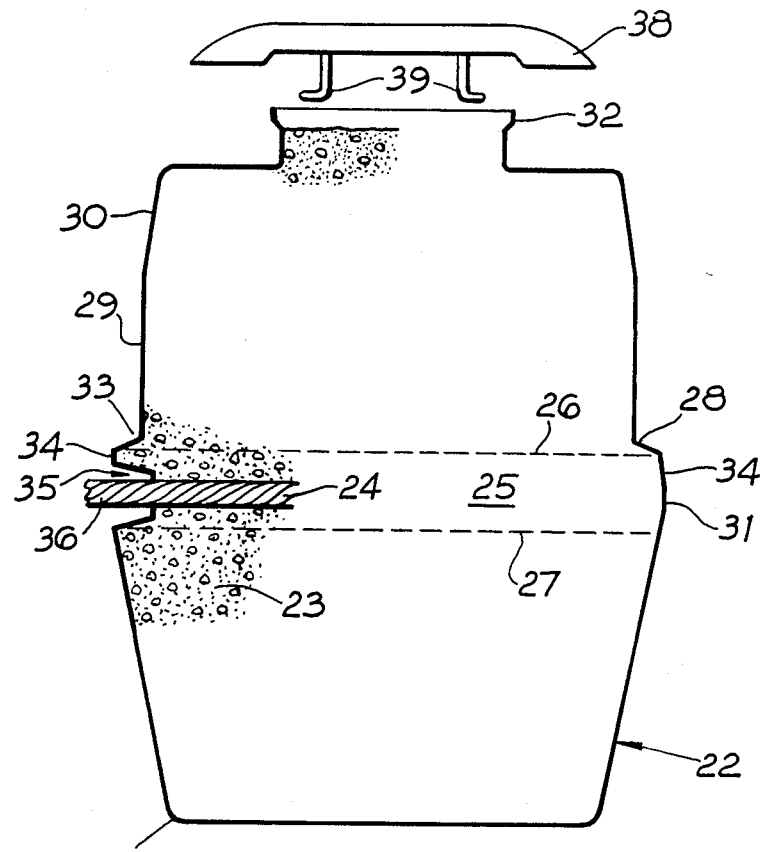
FIG. 8 is a section through a second segment.
Figure 9:
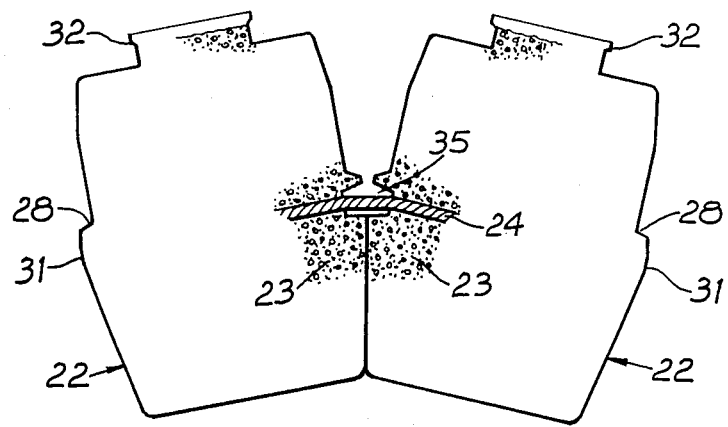
FIG. 9 is a section through two second segments shown in overbend.
Figure 10:
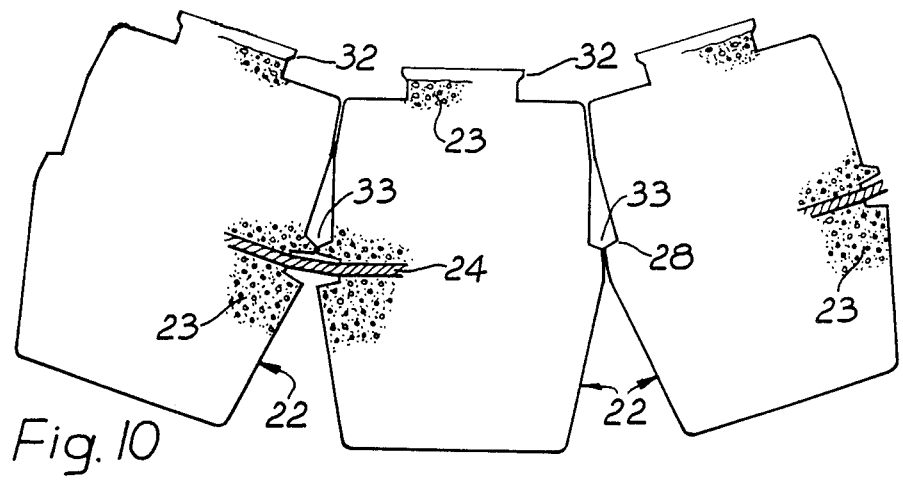
FIG. 10 is a section through three second segments shown in sagbend.
Figure 11:
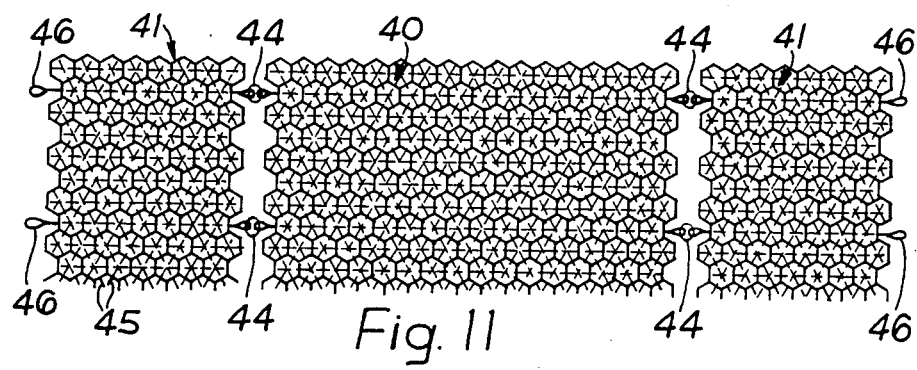
FIG. 11 is a plan view of a fifth blanket.
Figure 12:
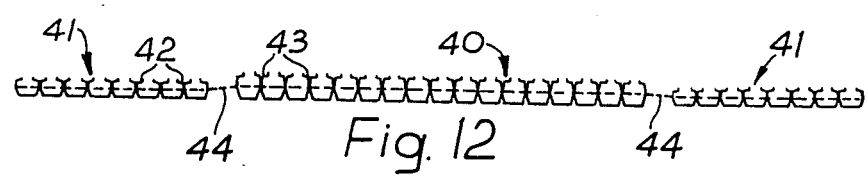
FIG. 12 is a section through the blanket of FIG. 11.
Figure 13:
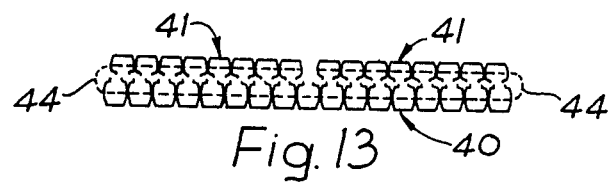
FIG. 13 is a section through the blanket of FIG. 11 folded for storage and transportation.

FIGS. 8 to 10 show in detail a second type of segment for making blankets embodying the invention.

The segment comprises a blow moulded polyethylene shell 22 of thickness 1 mm to 2 mm. Within the shell 22 is a concrete 23 which provides a dense infill for the shell 22 and also serves to hold ropes 24 in position.

It will be appreciated that the sections are not taken through the centre of the segment but are off centre so that the median zone is shown, at the point of entry of the rope 24 and away from the point of entry of the rope.

As can be seen from the FIG. the median zone does not comprise a single plane but a zone 25 between two substantially parallel planes 26 and 27. The cross-sectional area of the segment is at a maximum at the median zone and tapers regularly towards one end which is the base as shown in FIG. 8. Towards the other end of the segment (the top of the segment, in FIG. 8) the cross section has a reduced portion to form a shoulder 28, a parallel zone 29 and a tapered region 30.

Within median zone 25 is defined a 'flat' 31 of constant cross-section along the face of a segment to either side of the point of entryof the rope 24 aligned with rope 24. The flat 31 is 5 mm in height.

When a blanket is formed, the segment shells 22 are arranged contiguously with ropes 24 extending through them. The ropes 24 are pulled tightly to pull the segments in closely together. The flats 31 come into contact and prevent the edge of one segment riding up over the edge of an adjacent segment.

Once this has been done the concrete infill 23 can be introduced. It is introduced via collar 32. The concrete 23 is then allowed to set. The shell 22 retards the set of the concrete 23 to strengthen it. Once set, the rope 24 is held firmly in position.

The shoulder 28 forms a recess 33 between adjacent segments, when the segments are in sagbend as shown in FIG. 10. Thus the segment walls are not pushed against any debris between the segments. The debris can lie within recess 33 without being 'nut-crackered' between shell walls 22.

As can be seen the median zone 25 includes part of a taper 34 aligned with tapered end 30 so that in sagbend pivoting of the segments may occur.

At the point of entry of rope 24 is defined a bellmouth 35 which prevents rubbing or abraiding of the rope 36 lying between adjacent segments. It creates a 'free' distance within which the rope flexibility can act.

As can be seen in FIG. 9 the segments are efficient in overbend.

Each corner 37 of the segment is radiused to reduce any stress on the concrete when the segments compress as the blanket is draped.

An addition to the segments is shown schematically in FIG. 8. If the blanket is to be used in a situation where extreme protection against abrasive hazard of anchor or construction lines dragging across the top of the pipeline it is possible to fit steel caps 38 to the collars 32. Rag Bolts 39 can be embedded into the concrete 23 to affix the cap in position to produce an impermeable studded surface.

FIGS. 11 to 14 show a fifth example of a blanket embodying the invention. This comprises a central strip 40 which forms the main protection panel coupled on each side to a wing 41 comprising segments 42 of smaller size and weight than segments 43 of the main central strip 40.

Here the height of the smaller segments 42 is 100 mm.

The wings 41 are coupled to the central strip 40 by loose hinges 44 which allow the wings to be folded over on top of central strip 40 for easy stacking and transportation. To do this it is necessary for the width of each wing 41 to be less than half the width of central strip 40.

The folded blanket can be lifted by a single beam for transportation. A spreader frame slightly wider than central strip 40 is used in installation of the blanket to ensure that wings 41 fold outwards.

The diagonal tie ropes 45 of the wings 41 have a low break strain. The main lift ropes 46 lie perpendicular to the pipeline.

If an anchor 47 snags in one of the wings 41 the wing 41 lifts until the diagonal tie ropes 45 break which causes the anchor to divert.

Figure 14:
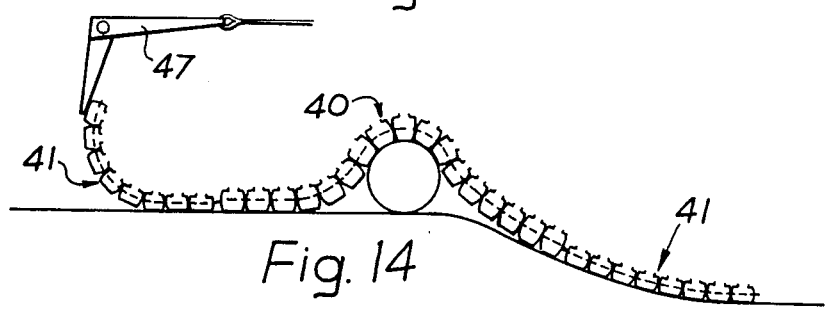
FIG. 14 is a schematic section of the fifth blanket in two alternative modes of function.
Figure 15:
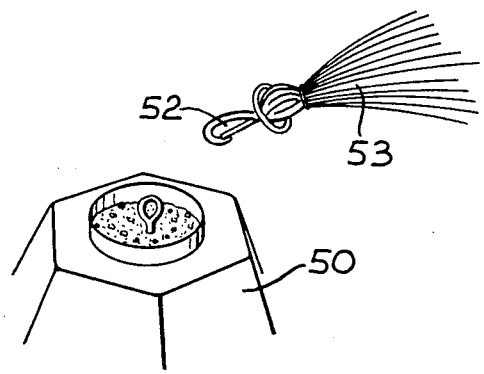
FIG. 15 is a schematic perspective view of the method of formation of a sixth blanket.

Another function of this blanket is erosion control as shown in the righthand side of FIG. 14. Here the wings 41 have increased the width of the blanket to increase erosion control. However, because the segments 42 are so small they are of lower cost than the segments 43 of the main central strip 40.

In a sixth blanket selected segments 50 have embedded in the concrete an eye 51. Onto eye 51 is hooked via spring biased hook 52 fronds 53 of artificial buoyant seaweeds similar to that sold by Linear Composites Limited of Harrogate, Yorkshire, England.

Figure 17:
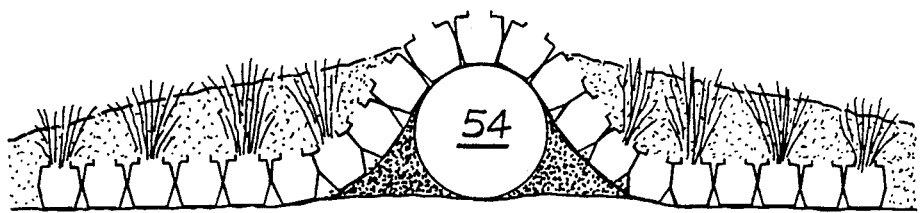
FIG. 17 is a schematic section of the sixth blanket, in use.

The frond bundles 53 are buoyant and tend to stand upright, thus interrupting currents flowing over the blanket. This causes sediment in suspension to settle in and around the fronds 53 to form a stabilised sand bank as shown in FIG. 17.

Figure 16:
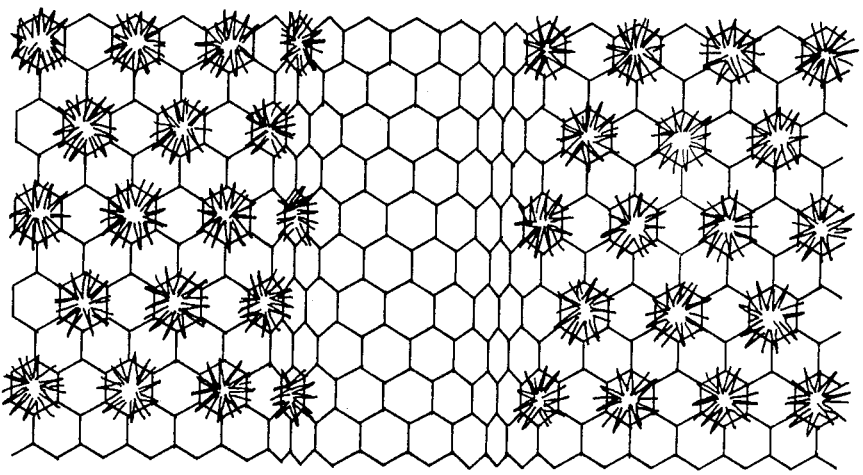
FIG. 16 is a plan view of the sixth blanket.

This gives better protection to the pipeline 54. It is not necessary to attach fronds 53 to each segment but a grid pattern such as shown in FIG. 16 gives advantageous results.

Figures 18, 19:
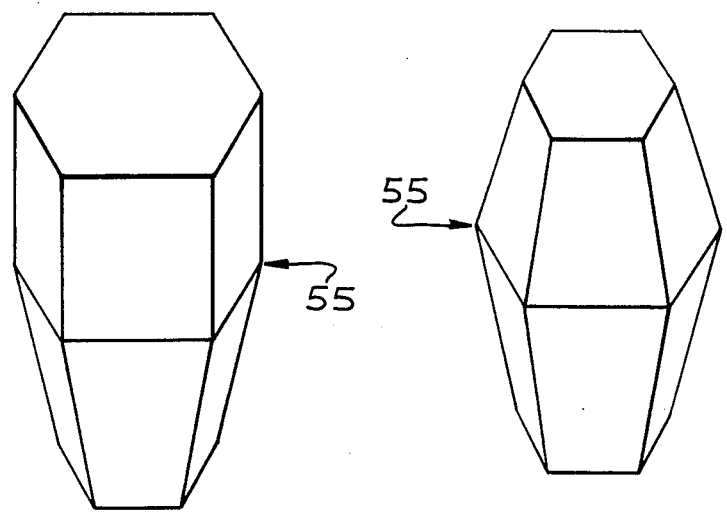
FIG. 18 is a perspective view of a second segment for use in a blanket embodying the invention.
FIG. 19 is a perspective view of a third segment for use in a blanket embodying the invention.

FIGS. 18 and 19 show second and third segments, which are also for use in blankets embodying the invention. Each segment as a waist portion 55 where the segment is of maximum cross-sectional area. It is at this point that each segment touches the next adjacent segment in the blanket. The segment shown in FIG. 18 is parallel-sided at one end and tapered at an angle between 20° and 30° toward the other end. This enables a blanket made of such segments to either sag-bend or over-bend depending on which way up the segments are used. The segment shown in FIG. 19 tapers from the waist portion 55 toward each end to an equal degree. Such segments can be used to make a blanket which will both sag-bend and over-bend as is required.

The segments are constructed from a settable compound comprising an aggregate, a filler and a binder. Materials which may be used are stone, granite, magnetite, haematite, illmenite ferrosilicon, potash, microsilicone, cement and/or epoxy resin. The material chosen depends on the function of the blanket. One function is to act as a ballast to hold pipe lines or structures in place in which case their prime characteristic is a high density. In such cases, the heaviest possible aggregate, such as ferrosilicon is used and the product density may be as high as 5.4 tonnes/m3. Alternatively, the blanket may be provided to protect against anchor or construction line sawing in which case hardness is the prime characteristic required. In this case, a hard filler, such as granite is used, and the hardness may be as high as 7 on the Mohs scale. In some circumstances, both density and hardness may be required in which case a compromise is reached between the characteristics.

Figure 20:
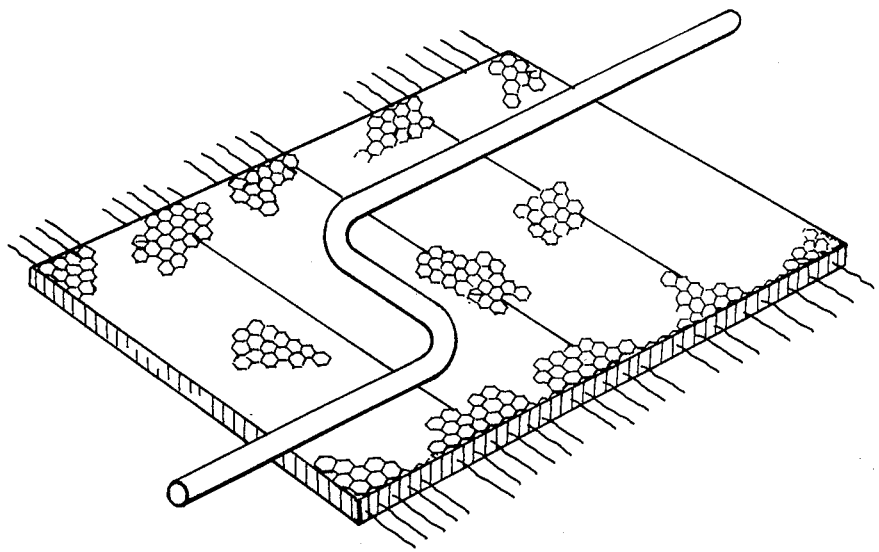
FIG. 20 shows blankets embodying the invention laid contiguously in the form of surface paving.

FIG. 20 shows a blanket laid in contiguous paving on the sea bed enabling the perimeter to operate as a scour skirt to protect the elevation of the inner area for use as a constant elevation slip-pad under, for example, a pipe line expansion loop or as a protected foundation raft for super-imposed structures, pipe lines, equipment and the like.

I claim:

1. A flexible blanket for protection or stabilization of underwater structures and pipe lines, unstable beds and embankments,
   said blanket comprising at least one layer,
   said layer comprising a plurality of separate and distinct block members spaced one from another,
   each separate block member having a top and bottom, and a median zone disposed between said top and bottom,
   each separate block member having a cross-section taken substantially perpendicular to the height dimension of the segment, which is a regular polygon, which cross-section has a maximum at said median zone and a minimum at at least one of said top and bottoms,
   each separate block member tapering substantially regularly from said maximum cross-section to said minimum cross-section; and
   means flexibly securing each said block member to a plurality of other adjacent block members to form a layer one block member in height, such that each block member lies substantially contiguous to all its adjacent block members, at said median zone, such that the layer at the median zone is substantially continuous and flexible,
   said securing means securing each block member to its adjacent block member in the region of their respective median zones, said securing means being substantially flexible to allow said block members to pivot relative to one another insofar as the tapers of the block members permit; the arrangement of the tapers being such that each block member may pivot in at least two directions, said directions being mutually non perpendicular.

2. A blanket in accordance with claim 1, wherein each block member is, in plan view, a regular hexagon.

3. A blanket in accordance with claim 1, wherein each block member comprises a block of material being a mixture of an aggregate, a filler and a binder.

4. A blanket in accordance with claim 3, wherein said aggregate comprises at least one component of stone, granite, magnetitie, illemite or ferrosilicon, and said fillers and binders comprise at least one component of potash, microsilicate, cement or epoxy resin.

5. A blanket in accordance with claim 1, wherein each block member comprises a plastics shell filled with an infill, said infill being of a material having a density greater than the density of said shell.

6. A blanket in accordance with claim 5, wherein said plastics shell is blow molded polyethylene and said infill is concrete.

7. A blanket in accordance with claim 1, wherein each block member tapers at an included angle in the region of 20° to 30°.

8. A blanket in accordance with claim 1, wherein the blanket comprises a plurality of layers, some of said layers not extending over the entire area of the blanket, and means securing said layers together.

9. A blanket in accordance with claim 1, wherein said blanket is bendable about a radius greater than 200 mm in any direction.

10. A blanket in accordance with claim 1, wherein said blanket comprises a central strip and at least one wing connected to the said central strip, each wing including a layer of block members having a size smaller than the size of the block members forming said central strip, and at least some of the securing means of the wing being readily broken, such that an anchor snagging on a wing causes breakage of said weaker wing securing means rather than dislodgement of the blanket.

11. A blanket in accordance with claim 1, also including
a plurality of fronds of artificial seaweed and means attaching said fronds to said block members.

12. A blanket in accordance with claim 11, wherein said attaching means comprises
a snap fit hook;
means attaching said hook to the fronds;
an eye engageable by said hook; and
means mounting said eye onto one of said block members.

* * * * *